United States Patent
Fischer

[11] 3,716,051
[45] Feb. 13, 1973

[54] EXPANDIBLE CONNECTOR FOR FRACTURED BONES

[76] Inventor: Artur Fischer, Altheimer Strasse 219, D-7241 Tumlingen, Germany

[22] Filed: Sept. 8, 1971

[21] Appl. No.: 178,598

[30] Foreign Application Priority Data

Sept. 10, 1979 Germany.....................P 20 44 773.8

[52] U.S. Cl. ............................................128/92 BB
[51] Int. Cl. ...............................................A61f 5/04
[58] Field of Search.......128/92 BB, 92 R, 92 CA, 92 BC, 128/92 D, 92 B

[56] References Cited

UNITED STATES PATENTS

| | | | |
|---|---|---|---|
| 2,121,193 | 6/1938 | Hanicke | 128/92 BB |
| 2,243,717 | 5/1941 | Moreira | 128/92 BB |
| 2,381,050 | 8/1945 | Hardinge | 128/92 BB |
| 2,490,364 | 12/1949 | Livingston | 138/92 BB |
| 2,699,774 | 1/1955 | Livingston | 128/92 BB |

*Primary Examiner*—William E. Kamm
*Assistant Examiner*—J. Yasko
*Attorney*—Michael S. Striker

[57] ABSTRACT

A sleeve has a trailing end portion which is to be lodged in one fragment of a fractured bone, and an open-ended expansible leading end portion which is to be lodged in the other fragment, so that the sleeve bridges the fracture. The leading end portion is subdivided by a plurality of longitudinal slots into radially expansible shanks. A threaded member extends through a central passage of the sleeve, and in this passage adjacent the leading end of the leading end portion is located an expander member an exposed end face of which faces the open end. Integral parts of the expansible shanks extend at the open end transversely of the central passage at least to a threaded bore provided in the expansion member, in which bore the threaded element engages.

5 Claims, 1 Drawing Figure

PATENTED FEB 13 1973
3,716,051
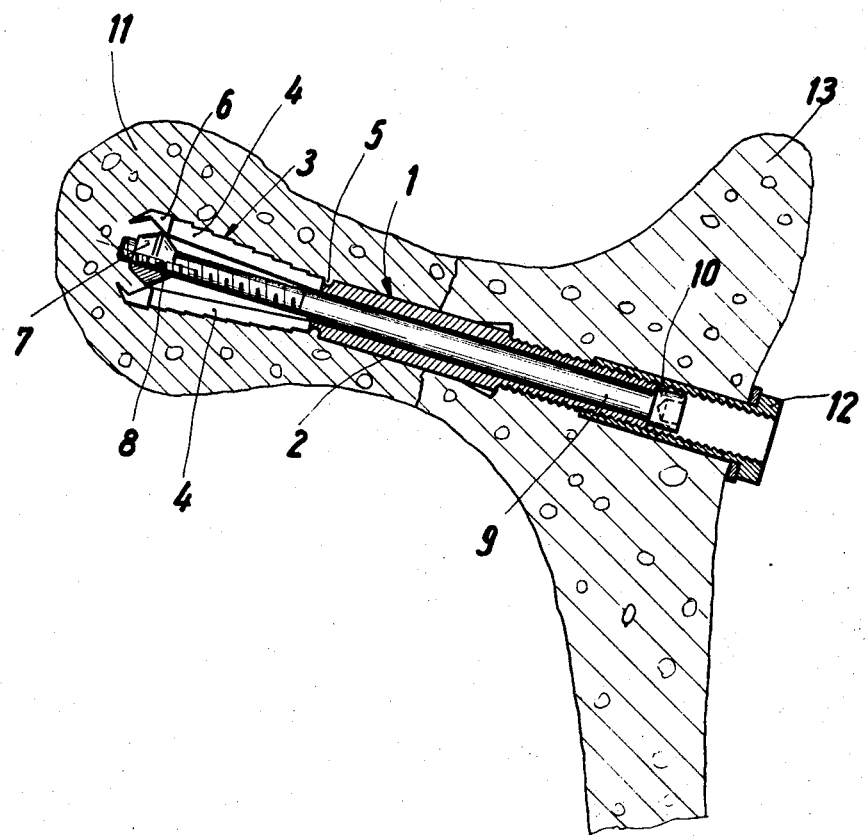
Inventor:
ARTUR FISCHER

EXPANDIBLE CONNECTOR FOR FRACTURED BONES

CROSS-REFERENCE TO RELATED APPLICATION

The present invention is a continuation-in-part of my earlier-filed application entitled "CONNECTOR FOR FRACTURED BONES," filed on Oct. 1, 1970 and copending under Ser. No. 77,267.

BACKGROUND OF THE INVENTION

The present invention relates generally to a connector for fractured bones, and more particularly to an expansible connector for fractured bones, especially for fractured femurs.

It is already known to provide such a connector, for instance from my aforementioned copending application. When such a connector is used to connect the fragments of a fractured bone, a nail or similar element is first driven into the bone—hereafter to be explained with reference to the mending of a fracture in a femur—in an orientation and direction which is determined by the fracture line. Of course, the nail must be driven through one of the fractured bone pieces into the other one. Thereupon, the sleeve of the connector with an expander member accommodated in the sleeve is then driven into the bone fragments about the previously inserted nail whose outer diameter corresponds to the inner diameter of a threaded bore provided in the expander member. The nail affords the sleeve the necessary precise position which is required to mend the fracture.

Once the sleeve has been driven into the bone to the necessary extent, the nail is withdrawn and a screw or bolt is threaded through the sleeve into the tapped bore of the expander member which is now vacated by the nail; further turning of the screw or bolt then draws the expander member into the sleeve and causes the latter to become expanded. The screw or bolt has a head, with the construction being such that the head will bear only against a bead or flange provided for this purpose on the sleeve itself, so that no axial forces required fr the expansion of the sleeve—that is for the drawing the expander member axially into the sleeve—will be transmitted to the bone which might otherwise be damaged or further fractured. Once the sleeve has been expanded to the desired extent, which takes place in only one of the bone fragments which are to be connected, a retaining element is threaded onto the sleeve portion which is located in the other bone fragment, so that the fragments are thus connected and drawn together. The portion of the sleeve which is radially spreadable is set off from the remaining portion of the sleeve by an exterior circumferential groove which facilitates such spreading.

This type of prior-art connector has been found in actual use to be highly efficacious in facilitating rapid healing of a bone fracture, which is not the least due to the fact that the fractured bone is immediately relieved along the fracture line of stresses when the connector is inserted.

However, it has been found that when the sleeve of the connector is driven into the bone about the previously inserted nail, the expansible portion of the sleeve at some times becomes unintentionally and prematurely expanded. Further driving of the sleeve into the bone becomes impossible as soon as even a very small amount of premature expansion has taken place, because if after small premature expansion an attempt is made to drive the sleeve further into the bone, the sleeve is only expanded still further. Not only does this make it impossible to properly insert the sleeve, but there is the actual danger that the bone might be damaged even further, particularly in the region of the fracture itself. Moreover, it is impossible—or almost so—to correct premature expansion of the sleeve once it has occurred. As a result, on occurrence of premature expansion the sleeve must be withdrawn from the bone fragment in order to deform the expansible portion again to its original un-expanded condition, and subsequently the sleeve must again be driven into the bone fragment.

It is hardly necessary to emphasize that the time available for the insertion of such a connector is strictly limited, because the patient will be as rule under anesthesia which must not be unnecessarily prolonged, and the path of movement of the sleeve in the bone must be observed via X-rays to which the patient also cannot be subjected for a prolonged period of time without running risks. As a result of this the occurrence of premature expansion of such a sleeve usually means that after the sleeve has been withdrawn, a new sleeve is utilized rather than making any attempt at deforming the partially expanded sleeve and reusing it. Aside from the expense involved it is of course evident that the possibility and even likelihood exists that even the new sleeve will again become prematurely expanded at the same point where the original sleeve became expanded, especially because the material of the bone surrounding the nail has become deformed by the premature spreading of the originally used sleeve and thus will facilitate premature expansion of a new sleeve also.

Attempts have been made to determine what causes this undesired premature expanding, and it has been found that as the sleeve is driven into the bone about the previously inserted nail, the bone material which is displaced during the insertion of the sleeve tends to push the expander member into the sleeve and thereby expand the latter. Furthermore, at least in the region of the fracture itself there are numerous small bone splinters which tend even further to displace the expander member into the sleeve, or which may even become wedged between the expander member and the inner wall of the sleeve and thus cause premature expansion.

SUMMARY OF THE INVENTION

It is, accordingly, an object of the present invention to provide an improved connector of the type under discussion which is not possessed of the disadvantages outlined above with respect to the prior art.

More particularly it is an object of the present invention to provide such an improved connector in which undesired premature expanding of the sleeve of the connector is avoided.

In pursuance of the above objects, and of others which will become apparent hereafter, one feature of the invention resides in an expansible connector for fractured bones which, briefly stated, comprises a sleeve adapted for insertion into a fractured bone so as to bridge the fracture thereof. The sleeve has a trailing end portion adapted to be located in one bone fragment, and an open-ended expansible leading end portion adapted to be located in the other fragment. The leading end portion has a plurality of longitudinal slots subdividing into radially expansible shanks. A central passage is provided in the sleeve extending longitudinally thereof, and an expansion member is located in this passage at the open end of the leading end portion and has an exposed end face which faces this open end. Threaded means are located in the passage for drawing the expansion member deeper into the passage in a sense expanding the shanks, and a plurality of cage portions are each provided at a front end of one of the shanks and extend across the open end at least in part covering the end face of the expansion member in the unexpanded condition of the sleeve.

The expansion member is provided with a longitudinally extending tapped bore into which subsequently the threaded means is inserted so that the expansion member can thereby be drawn into the sleeve for expanding the same. During the insertion of the sleeve into the bone, however, the threaded means is removed and the nail previously inserted into the bone passes through the tapped bore and subsequently through the passage of the sleeve. The construction according to the present invention insures that, as this takes place and as the sleeve with the expansion member is driven into the bone about the previously inserted nail, the expansion member is shielded against contact with and pressure by the bone material. Thus, no force acts upon the expansion member in longitudinal direction of the sleeve, and the expansion member cannot thus be prematurely driven into the sleeve in a sense expanding the latter. The entrance of bone splinters into the open end of the passage is also avoided with the construction according to the present invention. On the other hand, the construction according to the present invention is such that the circumferential groove provided in the outer surface of the sleeve and facilitating the expansion of the latter, can safely be retained without having to fear premature expansion as a result of its provision, because this is now reliably precluded.

Thus, the connector according to the present invention can be readily and rapidly inserted into a bone whose fractured portions are to be reunited, and the periods of time for which the patient must be subjected to anesthesia and to X-rays can be reduced to a minimum.

After the bone fracture has healed, the connector is withdrawn from the bone for which purpose the screw previously used for drawing the expander member into the bone is employed for pushing it back to and beyond the open end of the passage in the sleeve. This means that the length of the screw must be greater than would normally be required by the length of the expander member. The callous portions which have formed on the inner side of the expanded shanks, that is the bone growth which has take place, will enter into the place where previously the expander member was located when the connector is withdrawn.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic sectional view illustrating an embodiment of the invention.

DESCRIPTION OF THE PREFERRED EMBODIMENT

Discussing the drawing in detail it will be seen that the fractured bone shown is here illustrated as being composed of two bone sections 11 and 13, the fracture being clearly visible. For this purpose there is provided the connector 1 according to the present invention, which advantageously is of rust-free steel or another material which will not adversely act upon or influence the bone.

The connector 1 comprises a sleeve 2 having an expansible leading end portion 3 which is provided with a plurality of longitudinal slots, subdividing it into a plurality of shanks 4 which can be radially spread. Lead-end portion 3 is offset from the remainder of the sleeve 2 —but of one piece therewith—by a circumferential groove 5 provided in the outer circumferential surface of the sleeve 2 for the purpose of facilitating the radial expansion of the leading end portion 3.

The leading ends or free ends of the shanks 4 are each provided with a portion 6 which is bent inwardly across the open end of the central passage of the sleeve 2, as illustrated, and which in the non-expanded condition of the leading end portion 3 extend across the end face of the expander member 7—which latter is located in the passage at the open end—at least to the tapped bore 8 provided in the expander member 7 and extending longitudinally of the latter.

When the connector 1 is to be inserted into the bone, a nail (not illustrated) is first driven through the two bone segments 11 and 13 in the requisite direction and orientation. Thereupon the sleeve 2 is driven into the bone about the nail which latter passes first through the tapped bore 8 and thereupon through the passage in the remainder of the sleeve 2. Once the sleeve 2 has been inserted to the necessary extent (as illustrated) the nail is withdrawn and a screw or bolt 9 is inserted through the trailing end of the sleeve 2 into the central passage of the latter and brought into mesh with the threads in the tapped bore 8 of the expander member 7. Further turning of the screw 9 in requisite sense causes its head 10 to bear against the trailing end of the sleeve 2, which for this purpose is provided with the illustrated axial annular end face, and draws the expander member 7 into the sleeve, causing the shanks 4 of the leading end portion 3 to be radially spread as shown in the drawing. Thereupon a threaded sleeve-shaped element 12 is threaded onto the trailing end portion of the sleeve 2 as shown, bearing with its illustrated head against the outer side of the bone —with a metallic or elastomeric gasket being interposed if desired and as illustrated—and this is tightened until the two bone fragments or sections 11 and 13 are drawn together to the necessary extent so that the fracture can heal.

The cage formed by the portions 6 prevents the entry of bone material into the open end of the central passage of the sleeve and the forcing of the expander member 7 inwardly of the passage with concomitant expansion of the shanks 4, as the sleeve is driven into the bone. Expansion then takes place only when the sleeve is fully inserted and when it is desired to obtain such expansion.

It will be understood that each of the elements described above, or two or more together, may also find a useful application in other types of constructions differing from those described above.

While the invention has been illustrated and described as embodiment in a connector, it is not intended to be limited to the details shown, since various modifications and structural changes may be made without departing in any way from the spirit of the invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of the following claims.

What is claimed as new and desired to be protected by Letters Patent is set forth in the appended claims.

I claim:

1. An expansible connector for fractured bones, comprising a sleeve adapted for insertion into a fractured bone so as to bridge the fracture thereof, said sleeve having a trailing end portion adapted to be located in one bone fragment, and an open-ended expansible leading end portion adapted to be located in the other fragment, said leading end portion having a plurality of longitudinal slots subdividing it into radially expansible shanks; a central passage in said sleeve extending longitudinally thereof; an expansion member located in said passage at the open end of said leading end portion and having an exposed surface facing said open end; threaded means in said passage for drawing said expansion member deeper into said passage in a sense expanding said shanks; and a plurality of cage portions each provided at a front end of one of said shanks, and extending across said open end at least in part covering said end face in unexpanded condition of said sleeve.

2. A connector as defined in claim 1, wherein each of said cage portions is of one piece with the respectively associated shank.

3. A connector as defined in claim 1, said sleeve having an outer circumferential surface; and further comprising a circumferential groove provided in said surface in the region of juncture of said leading and trailing end portions.

4. A connector as defined in claim 1, said expansion member being provided with a central threaded bore extending longitudinally of said passage, and said threaded means extending into said bore and meshing with the threads thereof.

5. A connector as defined in claim 4, wherein said cage portions extend radially inwardly of said passage at least to the boundary of said bore.

* * * * *